United States Patent
Szumilas et al.

[15] 3,685,793
[45] Aug. 22, 1972

[54] PLUG-TYPE VALVE WITH LOST-MOTION ACTUATOR

[72] Inventors: Wladislaw Szumilas; Macedon Emil Adam; Ilie Lata; Gheorghe Muresan, all of Medias, Romania

[73] Assignee: Uzina Mechanica De Gas Metan Medias, Medias, Romania

[22] Filed: Jan. 20, 1970

[21] Appl. No.: 4,291

[30] Foreign Application Priority Data

Jan. 24, 1969 Romania.......................58865

[52] U.S. Cl..................................251/164, 251/312
[51] Int. Cl............................................F16k 5/16
[58] Field of Search......251/160, 161, 162, 164, 165, 251/166, 168

[56] References Cited

UNITED STATES PATENTS

| | | | |
|---|---|---|---|
| 2,139,632 | 12/1938 | Flodin | 251/166 |
| 2,795,960 | 6/1957 | Heinen | 251/165 X |
| 2,872,155 | 2/1959 | Hazard | 251/165 |
| 2,889,133 | 6/1959 | Blomstran | 251/164 |
| 2,054,812 | 9/1936 | Goldberg | 251/160 |
| 2,152,810 | 4/1939 | McFarlane | 251/160 |
| 2,748,605 | 6/1956 | Allen | 251/160 X |

*Primary Examiner*—Harold W. Weakley
*Attorney*—Karl F. Ross

[57] ABSTRACT

A plug-type valve has a rotatable conical plug received in a valve body and provided with a profile disk engaging a handle with lost motion. A detent on the disk retains the handle and disk for joint rotation until the disk engages a stop, whereupon rotation of the handle is permitted to axially shift the plug by screw action.

1 Claim, 2 Drawing Figures

PATENTED AUG 22 1972

3,685,793

Wladislaw SZUMILAS
Macedon Emil ADAM
Ilie LATA
Gheorghe MUREŞAN

INVENTORS

BY Karl F. R...

ATTORNEY

PLUG-TYPE VALVE WITH LOST-MOTION ACTUATOR

FIELD OF THE INVENTION

Our present invention relates to a valve-closing and valve-opening system and to a plug-type valve in which a conical plug is received in a conical body.

BACKGROUND OF THE INVENTION

Plug-type valves have been proposed heretofore for shutting off the flow of fluids in pipelines and operated by the rotation of a plug of frustoconical configuration in contact with a frustoconical seat, to disalign a passage of the plug from the passage of the body. Usually a rotation of 90° is required about the axis of the conical plug and seat, to completely cut off the flow of fluid. The conical plug is, as noted, provided with a passage which can have various shapes and which allows the fluid to pass when the passage is in line with the inlet and outlet of the cock. At its upper end, the cock is sealed by a stuffing box and at its lower end a conventional valve of this type may be provided with means for adjusting the tolerances of the fit of the plug within the seat, to insure rotatability of the plug.

A drawback of such valves is the unsatisfactory seal obtained with fluids of low viscosity, especially gas oil, gasoline or alcohol. The minimum clearance required to allow rotation of the plug frequently permits leakage of such fluids. The elimination of this clearance to obtain a tight fit has not been possible heretofore because the tapered character of the plug and seat produce a wedge-like interengagement of the plug and seat such that the plug cannot rotate.

OBJECT OF THE INVENTION

It is the principal object of the present invention to provide an improved system for the closing and opening of plug-type valves whereby the aforementioned disadvantages can be obviated.

SUMMARY OF THE INVENTION

This object and others which will become apparent hereinafter, are attained, in accordance with the present invention, in a plug-type valve comprising a valve body having a generally conical seat defining an axis, an inlet and an outlet opening laterally into this seat, a generally conical plug received in the seat without limitation of the fit or tolerance and having a passage adapted to register with the inlet and outlet in one angular position of the plug but disaligned in another angular position so as to block flow between the inlet and outlet, and mechanism for successively rotating and axially translating the plug to select the position and thereafter lock the plug without clearance for closing the valve or for axially releasing the plug and thereafter rotating same to open the valve. The rotating movement is thus achieved in a lifted or released condition such that the conical plug surface is withdrawn from the complementary surface of the seat. Frictional contact between the plug and the body during rotation of the plug is eliminated. This rotary movement is followed by an axial translation of the plug to lower it into the seat and insure a perfect tightening of the valve without any fractional clearance.

The mechanism may comprise a single handle which performs both operations, e.g. a lever adapted to rotate the plug through 90° and thereafter or prior thereto to axially shift the plug.

DESCRIPTION OF THE DRAWING

The above and other objects, features and advantages of the invention will become more readily apparent by the following description, reference being made to the accompanying drawing in which.

SPECIFIC DESCRIPTION

Figure 1:
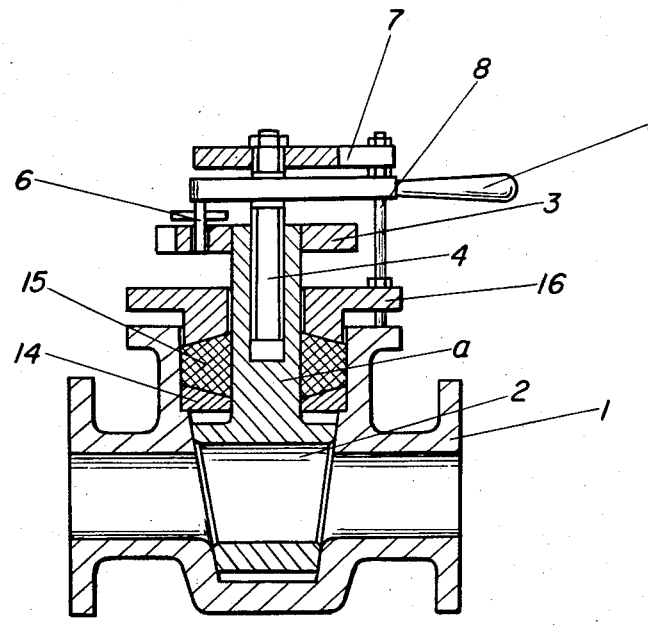
FIG. 1 is a longitudinal section through a cock or valve embodying the invention.

The valve or cock according to the invention comprises a valve body (having the usual inlet and outlet) into a frustoconical upwardly divergent seat of which a conical plug 2 is introduced. The plug 2, which has a passage alignable with the inlet and outlet in one position, but disaligned therefrom upon rotation of the plug into its closed position through 90°, has an axially extending shaft $a$ on which is fixed a profile disk 3 with an arcuate channel or slot $b$. The shaft $a$ is internally threaded and receives the threaded axle 54 which is rotatable by a handle 5 in the form of a lever fulcrumed on the axle 4 at the axis of the plug. A bolt 6 on this lever, remote from the handle, is slidably received in the slot $b$.

At its upper end, the axle 4 is rotatable in a bar 7 connected by support screws 8 to the body 1 so that the screw 4 remains immobile while the handle-lever 5 is freely rotatable thereon without axial displacement.

Figure 2:
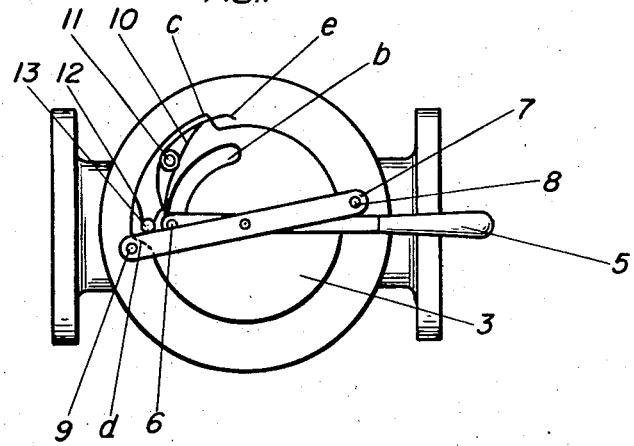
FIG. 2 is a plan view of the valve.

As can be seen in FIG. 2, the disc 3 is formed with an arcuate sector defined between flanks $c$ and $d$, respectively engageable with the screws 8 and 9 in opposite positions of the value. The sector may extend through 90° of arc as illustrated while the screws 8 and 9 are angularly spaced by about 180°.

A detent pawl or "click" is fixed on the disk 3 by a screw 11 and is biased by a spring 13 to retain the pin 6 at opposite ends of the slot $b$ until the detent is released. The spring 12 is mounted on the disk 3 by a screw 13.

At the upper portion of the valve body 1, a ring 14 is provided to act as a backing member for the packing washer 15 which is clamped in place by a stuffing box 16.

In order to shut off the valve, the manipulating handle is rotated in the clockwise sense (e.g., from the position shown in FIG. 2) and entrains by engagement with the detent 10, the disk 3, the shaft $a$ and the plug 2 through an angular motion of 90° until a shoulder $c$ of the disk 3 engages the screw 8 and prevents further rotation of the plug. The detent 10 at this point has its end $e$ swung inwardly by the screw 8 to free the pin 6. The handle 5 continues to rotate through the arc length of slot $b$ and unscrews the shaft 4 to press the plug 2 axially into the body. When it is desirable to open the valve, the handle 5 is rotated in the counterclockwise sense, thereby rotating the shaft 4 to lift the plug 2 from the body. When the motion has exceeded the end of the travel permitted by slot $b$, the plug is rotated into its open position

I claim:

1. A plug-type valve, comprising a valve body formed with a generally conical valve seat and an inlet and outlet communicating therewith;

a generally conical plug received in said valve seat and axially and angularly shiftable relative to said body, said seat and said plug defining an axis of rotation of said plug, said plug being formed with an axially extending shaft;

a support bar perpendicular to said axis and spaced axially from said seat, and at least one rod mounting said bar on said body and extending parallel to said axis but spaced therefrom;

a handle mounted on said bar and swingable about said axis, said handle being provided with an axle threadedly engaging said shaft for axially shifting said plug upon angular displacement of said handle, said shaft being formed with a disk perpendicular to said axis and between said bar and said body, said disk being formed with a sector describing a path upon rotation of said disk about said axis which is intercepted by said rod, said disk further being formed with an arcuate slot centered on said axis;

detent means interconnecting said plug and said handle for joint rotation over a limited arc, said detent means including a pin on said handle extending axially into said slot and receivable therein with lost motion about said axis, a rocker pawl having a first arm engageable with said pin, and spring means biasing said first arm into the path of said pin for entrainment of said disk therewith; and means including a second arm on said rocker pawl engageable with said rod for releasing said handle for angular displacement of said axle relative to said shaft upon angular immobilization of said plug by engagement of said sector with said rod whereby a rotating and a translating movement of said plug occur successively with angular displacement of said handle.

* * * * *